UNITED STATES PATENT OFFICE 2,671,809

CONTROLLED DECOMPOSITION OF ARALKYL HYDROPEROXIDES

Jan Pieter Fortuin and Hein Israel Waterman, Delft, Netherlands, assignors to Shell Development Company, Emeryville, Calif., a corporation of Delaware No Drawing. Application March 4, 1952, Serial No. 274,841

10 Claims. (Cl. 260—593)

This invention relates to improvements in the controlled decomposition of aralkylhydroperoxides. The invention relates more particularly to the production of phenols from alpha,alpha-substituted aralkylhydroperoxides.

Hydroperoxides, to the controlled decomposition of which the present invention relates, are obtained by the oxidation of aromatic compounds according to the empirical equation:

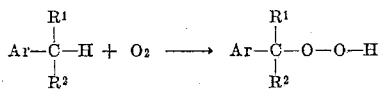

in which Ar represents an aromatic hydrocarbon radical selected from the group consisting of aryl and alkaryl groups and $R^1$ and $R^2$ each represent the same or a different member of the group consisting of any monovalent organic radical, aliphatic, cycloaliphatic, aromatic heterocyclic including hydrocarbon radicals such as alkyl, cycloalkyl, aryl, aralkyl, alkaryl, saturated and unsaturated groups. The radical Ar may be mono- or poly-nuclear and may be further substituted by minor substituents such as methoxy, ethoxy, radicals. The aromatic hydrocarbons oxidized to obtain the organo hydroperoxides to which the invention relates comprise the alkyl benzene hydrocarbons in which the substituents are one or more alkyl groups, one of which has a tertiary carbon atom attached to the benzene ring. Such alkyl benzene hydrocarbons include, for example, isopropyl benzene, α-methyl-α-ethyl-methylbenzene, p-methyl-isopropyl benzene, p-diisopropyl benzene, isopropyl naphthalene, their homologues and analogues.

Molecular oxygen, i. e. pure oxygen gas or a mixture of gases comprising oxygen, e. g. air, is generally used as the oxidizing agent, while the aromatic compound to be oxidized is in the liquid state.

In the specific case wherein the above formula $R^1$ and $R^2$ are both methyl groups and Ar is a phenyl group, the original aromatic compound is cumene, from which cumene hydroperoxide is formed by the oxidation according to the equation

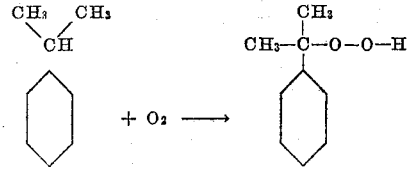

Cumene may be easily prepared by alkylating benzene. This was performed on a large scale during World War II, as cumene was used in motor spirit for aircraft.

Methods of preparing the above defined aralkyl hydroperoxides by oxidation of the above-defined aromatic compounds have been disclosed heretofore.

Subjection of the alpha,alpha-substituted aralkyl hydroperoxides to decomposition results in the obtaining of reaction mixtures containing phenols and ketones. Thus cumene hydroperoxide decomposition results in the obtaining of a reaction mixture containing phenol and acetone. The overall process for the oxidation of cumene to cumene hydroperoxide followed by the decomposition of the cumene hydroperoxide to phenol and acetone may be represented by the following empirical formula:

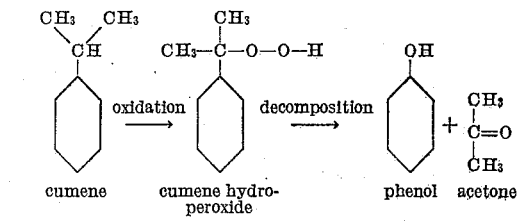

Similarly the conversion by successive oxidation and decomposition of the alpha,alpha-substituted alkylbenzenes to phenols and ketones may be further illustrated by the following empirical reactions:

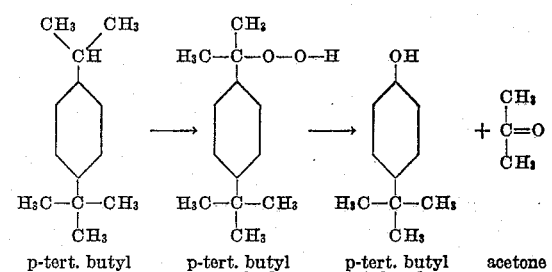

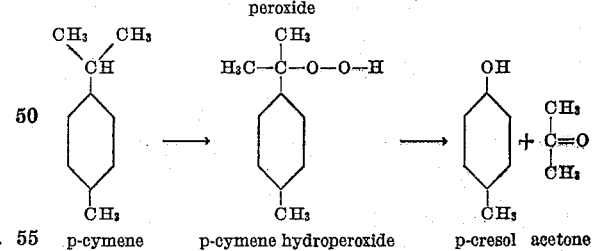

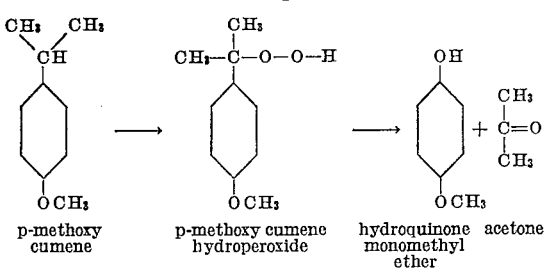

| p-methoxy cumene | p-methoxy cumene hydroperoxide | hydroquinone monomethyl ether | acetone |

Methods disclosed heretofore directed to the decomposition of cumene hydroperoxide generally involve the use of operational procedures resulting in difficulties often militating against practical operation of the process. Such difficulties comprise, for example, the formation of highly corrosive materials or of mixtures separable only by costly and complex operational procedures. Yields of the desired phenol by such methods are generally erratic and often exceedingly low. Unavoidable by-product formation comprising, for example, such materials as acetophenone and methanol often detract from efficient production of phenol and ketone by such methods.

It is an object of the present invention to provide an improved process enabling the more efficient production of phenols and ketones from alpha,alpha-substituted aralkyl hydroperoxides wherein the above difficulties are obviated to at least a substantial degree.

A more particular object of the invention is the provision of an improved process enabling the more efficient conversion of alpha,alpha-dialkyl substituted alkylbenzene to phenols and ketones.

A specific object of the invention is the provision of an improved process enabling the more efficient conversion of isopropylbenzene to reaction products comprising phenol and dimethyl ketone. Other objects and advantages of the invention will become apparent from the following detailed description thereof.

In accordance with the present invention aralkyl hydroperoxides, such as, for example, alpha,alpha-dialkyl alkylbenzene, are decomposed to reaction mixtures comprising phenols and ketones by heating in the presence of a catalyst consisting essentially of a sulfate salt of a metal selected from the bivalent metals of the right sub-group of group I and of the group II of the periodic table of the elements.

Particularly advantageous aralkyl hydroperoxide compounds employed as charge in the present invention are the aralkyl hydroperoxides comprising the hydroperoxides of the alkyl benzenes which have at least one replaceable hydrogen atom directly attached to the benzene ring and in which the hydroperoxide group (—O—O—H) is linked to an aliphatic carbon atom which is directly attached by a single bond to a nuclear carbon atom in the benzene ring. The suitable alkyl benzene hydroperoxides are represented by the empirical formula

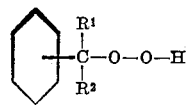

(I)

wherein the $R^1$ and $R^2$ represent the same or different members of the group consisting of hydrogen and hydrocarbon radicals such as alkyl, cycloalkyl, aryl, alkaryl, and aralkyl. The radical $R^1$ may be joined to the radical $R^2$ to form a cyclic nucleus containing the carbon atom to which the hydroperoxide group is attached. One or more replaceable hydrogen atoms attached to the benzene nucleus except at least one may be substituted by an aliphatic hydrocarbon radical such as alkyl and cycloalkyl radicals.

The above defined alkyl benzene hydroperoxides may be referred to as members of the class consisting of benzyl hydroperoxide and hydrocarbyl-substituted benzyl hydroperoxides such as alkyl- and cycloalkyl-substituted benzyl hydroperoxides.

Preferred are the secondary and tertiary alkyl benzene hydroperoxides wherein the hydroperoxyl (—O—O—H) group is attached to a secondary or tertiary carbon atom which is in turn directly linked by a single bond to the benzene nucleus. These preferred alkyl benzene hydroperoxides, that is, $\alpha,\alpha$-dialkylphenylmethyl hydroperoxides, are represented by the above Formula I when both of the radicals $R^1$ and $R^2$ are the same or different members of the group consisting of alkyl and cycloalkyl radicals.

Examples of the above-defined organo hydroperoxides are:

Benzyl hydroperoxide
p-Xylyl hydroperoxide
$\alpha$-Phenylethyl hydroperoxide
$\alpha$-Propyl benzyl hydroperoxide
$\alpha,\alpha$-Dimethylbenzyl hydroperoxide
$\alpha$-Ethyl-$\alpha$-methylbenzyl hydroperoxide
$\alpha,\alpha$-Dimethyl-p-methylbenzyl hydroperoxide
$\alpha,\alpha$-Dimethyl-p-isopropylbenzyl hydroperoxide
Diphenylmethyl hydroperoxide
1-tetralyl hydroperoxide
$\alpha,\alpha$-Dimethylnaphthylmethyl hydroperoxide
$\alpha,\alpha,\alpha',\alpha'$-Tetramethyl-p-xylylene dihydroperoxide Of the organo hydroperoxide compounds defined herein as suitable starting reactants, those wherein the total number of carbon atoms range from 7 to about 26, and wherein individual substituent hydrocarbon groups such as alkyl or cycloalkyl substituents contain from 1 to about 14 carbon atoms may be employed in the production of compounds of particular value in specific fields of application.

The aralkyl hydroperoxides need not necessarily be in a pure state when subjected to controlled decomposition in accordance with the invention. An advantage of the invention, however, resides in its ability to effect the efficient conversion of even relatively pure aralkyl hydroperoxides to reaction mixtures containing the desired phenols. The aralkyl hydroperoxides may be subjected to the decomposition reaction while dissolved in suitable solvent. Solvents which may be employed comprise any organic solvent which is relatively stable under the conditions of the decomposition reaction. Suitable solvents comprise, for example, aliphatic, aromatic and alicyclic hydrocarbons, alcohols, ethers, ketones, halogenated hydrocarbons, and the like.

The sulfate salts of the bivalent metals of the right hand sub-group of group I and of the metals of group II of the periodic table employed as catalysts comprise the sulfates of Be, Mg, Ca, Sr, Ba, Cu. Of these salts the use of copper sulfate or calcium sulfate is preferred. It is preferred to employ the salt in a form substantially free of water of hydration. Thus anhydrous copper sulfate, and calcium sulfate which has been at least partially dehydrated are particularly preferred. A suitable calcium sulfate catalyst is obtained by partially dehydrating gypsum, for example, by heating gypsum at 300° C. for approximately one hour followed by further heating at a still higher temperature, for example, at about 500° C. to about 550° C. for a half hour. The presence of the sulfate salt catalyst in an amount ranging from about 5 to about 20 per cent by weight of the liquid phase present in the reaction zone has been found satisfactory. Greater or lesser amounts of catalyst may, however, be employed within the scope of the invention.

Suitable means assuring good contact between the solid catalyst and the reactants are generally resorted to. Thus conventional means such as stirring, agitation by passage of inert gas through the liquid, turbulent flow through tubular reactors, etc., may be employed. The solid catalyst may be introduced into the reaction zone in the form of chunks, pieces, powder, or suspended in a suitable inert solvent, or the like.

The presence to any substantial degree of undesirable side reactions is obviated by avoiding the use of excessively high temperatures during the decomposition reaction. The decomposition is preferably carried out at a temperature in the range of for example, from about 50° C. to about 100° C., and preferably from about 60° C. to about 85° C. Somewhat higher or lower temperatures may however be employed within the scope of the present invention.

In a preferred method of carrying out the process the aralkyl hydroperoxide charge is introduced into the reaction zone in carefully controlled amounts. Thus, the dropwise addition of the hydroperoxide, especially when it is employed as such or in the form of a concentrated solution is advantageous in that it facilitates the maintenance of desired operating conditions since the exothermic heat of reaction is relatively high. Solutions of the aralkyl hydroperoxide in the corresponding aralkyl hydrocarbons from which they are derived by oxidation are particularly desirable as charge materials for the process of the invention. The process thus enables the direct use of the hydroperoxide-containing mixtures obtained by the oxidation with molecular oxygen of the aralkyl hydrocarbons. Although the use as charge of the hydroperoxides in the form of a solution is desirable it is to be pointed out that the use of very dilute solutions are generally not preferred. Solutions of hydroperoxides in aralkyl hydrocarbons which contain from about 30 to about 50% by weight of the hydroperoxides are preferred.

The two stage process comprising the oxidation of an aralkyl hydrocarbon to a hydroperoxide-containing reaction mixture, followed by the decomposition of the hydroperoxide in the oxidation reaction mixture to a phenol-containing reaction mixture, may be carried out continuously in accordance with the invention. Unconverted aralkyl hydrocarbons separated from the phenol-containing products emanating from the second step may be recycled to the initial aralkyl hydrocarbon oxidation step of the process.

An advantage of the present invention resides in the ability to effect the separation of the catalyst from the reaction products by relatively simple, ordinary, practical scale separating means such as, for example, decantation, filtration, centrifuging, and the like. The catalyst is thus separated from the components of the reaction mixture under the conditions prevailing during product separation. After the separation of the catalyst the reaction mixture is subjected to suitable product separating means to effect the recovery of the desired phenol therefrom.

The reaction mixtures comprising the desired phenols may be subjected to any suitable product recovery operation comprising, for example, one or more such steps as, distillation, decantation, fractionation, solvent extraction, adsorption, and the like, to separate therefrom not only the desired phenol but also the unconverted aralkyl hydrocarbon as well as any by-products formed during the reaction. Thus the reaction mixture obtained by the decomposition of cumene hydroperoxide, comprising phenol in admixture with unconverted cumene, may be processed to effect the efficient recovery therefrom of high purity phenol with high yields. Moreover, unreacted cumene is recovered substantially free from phenol, so that it may be recycled preferably after removal of any acetophenone and/or methyl styrene therefrom. Thus the mixture obtained by the decomposition of cumene hydroperoxide, and containing phenol, acetone, acetophenone and methyl styrene may be extracted with water at temperatures between about 50° C. and about 100° C., preferably between about 70° C. and about 80° C., for the recovery of the phenol which dissolves practically entirely in the water. The extraction is, preferably, performed after the acetone has been removed, for instance, by distillation. Cumene is purified by a distillation for separating it from acetophenone and by subsequent hydrogenation for converting alpha-methyl styrene to cumene.

Though phenol may be separated from the reaction mixtures obtained in the process of the invention by methods involving extraction substantially as described, other methods may be used. It should be observed that acetophenone and α-methylstyrene are formed in only relatively small amounts in the process of the invention. Ordinary practical scale separation procedures therefore suffice to effect the desired separation of the reaction product.

The following separation method, however, enables the quantitative recovery of the phenolic compound. The catalyst is separated from the liquid reaction mixture by filtration. Phenol is then neutralized, for instance, with diluted aqueous sodium hydroxide solution. The resulting liquid, consisting of an aqueous and an organic phase, is distilled, the ketone and in some instances also the organic solvent and part of the water being evaporated and the sodium salt of the phenolic compound being left in the residue.

Often a substantially quantitative separation of the components is easily attained when only the ketone is distilled off. If, for instance, the reaction mixture consists essentially of acetone, phenol and unreacted cumene, substantially all of the acetone distils under 95° C., and substantially all of the cumene and water above this temperature. After the acetone has been distilled off, the aqueous phase and the cumene phase of the residue may be separated. Before such separation a further quantity of sodium hydroxide solution is preferably added to make sure that no phenolic compound remains dissolved in the cumene phase, and that practically all of it dissolves in the, then alkaline, aqueous phase. Any resinous products present remain behind in the distillation vessel or are dissolved in the cumene phase, from which they may be separated by distillation.

Water is evaporated from the aqueous liquid. The solid residue consists of sodium phenolate having admixed therewith some sodium hydroxide. Phenol may be prepared from the crude sodium phenolate by treatment with a diluted acid and subsequent phase separation.

In practical scale separation of reaction mixtures obtained by the process of the invention, a fractional distillation method is preferred without previous neutralization of the phenolic components. The catalyst is removed by filtration. The components of the liquid mixture are then separated and collected.

In fractionating a mixture, comprising acetone, cumene and phenol, the components are distilled over in the order mentioned, the separation generally being sufficient for practical scale purposes. Resinous products, if present, form a residue in the distillation vessel.

The invention is illustrated by the following non-limitative examples. All percentages given are by weight. Concentrations of hydroperoxides were iodometrically determined by means of the method described on page 979 in Analytical Chemistry 19 (1947), using isopropyl alcohol as the solvent for the sodium iodide.

*Example I*

In over 3 hours' time 23.8 grams of substantially pure cumene hydroperoxide were introduced dropwise into a flask containing 2.0 grams of anhydrous cupric sulphate positioned in an oil bath heated at 95° C. After the entire amount of the hydroperoxide had been added the liquid in the flask was cooled to approximately 40° C. The catalyst was removed by filtration. The liquid was then neutralized to litmus by means of 1N aqueous potassium hydroxide solution, 60 millilitres being required. Acetone was distilled off until a temperature of 95° was reached. The distillate was collected in a graduated one-liter flask, which was filled with water to the one-liter mark after the end of the distillation. The acetone content of this liquid was determined by the method described on page 702 of Ind. Eng. Chem. 18 (1926).

The distillation residue was transferred to another graduated one-liter flask, which was filled with water to the mark. The phenol content of the liquid was determined by the method described on page 392 of Ind. Eng. Chem. 5 (1913).

The amounts of acetone and phenol which were determined in this way amounted to 65.1 and 65.0% of the theoretical yield, respectively.

*Example II*

During 3 hours' time approximately 25 grams of substantially pure cumene hydroperoxide were introduced dropwise into a flask which contained 2.0 grams of partially dehydrated calcium sulphate. The calcium sulfate had been dehydrated according to the process described in Journ. Indiana Chem. Soc., Industr. News Edition 10 (1947), 17–23. The flask was placed in an oil bath heated to 95° C.

After the entire amount of the hydroperoxide had been added and the liquid in the flask had cooled to approximately 40° C. the catalyst was removed by filtration. The liquid was then separated into four fractions, viz.:

I. Boiling below 60° C.
II. Boiling range 60°–170° C.
III. Boiling range 170°–185° C.
IV. Resinous residue.

The first fraction consisted substantially only of acetone and the third substantially only of phenol.

The presence of acetone and phenol respectively was determined by means of analytical methods using sodium nitroprusside and ferric chloride, respectively, as reagents. Phenol was, moreover, reacted with bromine water.

The invention claimed is:

1. The process for the conversion of an alpha,-alpha-dialkyl arylmethyl hydroperoxide to a phenolic compound-containing reaction mixture which comprises heating said alpha,alpha-dialkyl arylmethyl hydroperoxide in the presence of a sulfate salt of a metal selected from the divalent metals of the right subgroup of group I and the divalent metals of group II of the periodic table.

2. The process for the conversion of an alpha,-alpha-dialkyl arylmethyl hydroperoxide to a phenolic compound-containing reaction mixture which comprises heating said alpha,alpha-dialkyl arylmethyl hydroperoxide at a temperature of from about 50° C. to about 100° C. in the presence of a sulfate salt of a metal selected from the divalent metals of the right subgroup of group I and the divalent metals of group II of the periodic table.

3. The process for the conversion of an alpha,-alpha-dialkyl-benzylhydroperoxide to a phenol-containing reaction mixture which comprises heating said alpha,alpha-dialkyl-benzylhydroperoxide at a temperature of from about 50° C. to about 100° C. in the presence of a sulfate salt of a metal selected from the divalent metals of the right subgroup of group I and the divalent metals of group II of the periodic table.

4. The process in accordance with claim 3 wherein said sulfate salt of a metal is calcium sulfate.

5. The process in accordance with claim 3 wherein said sulfate salt of metal is copper sulfate.

6. The process in accordance with claim 3 wherein said alpha,alpha-dialkyl-benzylhydroperoxide is dissolved in an alpha,alpha-dialkyl-methylbenzene.

7. The process for the conversion of alpha,-alpha-dimethylbenzylhydroperoxide to a reaction mixture comprising phenol and acetone which comprises heating said alpha-alpha-dimethylbenzylhydroperoxide at a temperature of from about 50° C. to about 100° C. in the presence of a sulfate salt of a metal selected from the divalent metals of the right subgroup of group I and the divalent metals of group II of the periodic table.

8. The process in accordance with claim 7 wherein said sulfate of a metal is calcium sulfate.

9. The process in accordance with claim 7 wherein said sulfate of a metal is copper sulfate.

10. The process in accordance with claim 7 wherein said alpha-alpha-dimethylbenzylhydroperoxide is dissolved in isopropylbenzene.

JAN PIETER FORTUIN.
HEIN ISRAEL WATERMAN.

References Cited in the file of this patent

FOREIGN PATENTS

| Number | Country | Date |
| --- | --- | --- |
| 626,095 | Great Britain | July 8, 1949 |

OTHER REFERENCES

Kharasch et al., Jour. Organic Chemistry, vol. 15, No. 4 (July 1950), pp. 748–752 (5 pp., page 751 only is pertinent).